United States Patent
Song et al.

(10) Patent No.: US 9,029,624 B2
(45) Date of Patent: May 12, 2015

(54) TREATMENT METHOD FOR SPENT CAUSTIC SODA

(75) Inventors: Bang Un Song, Gyeonggi-do (KR); Sung Ho Lee, Incheon (KR); Young Seek Yoon, Gwangju (KR); Seung Hoon Oh, Seoul (KR)

(73) Assignee: SK Energy Co., Ltd., Seoul (KR)

( * ) Notice: Subject to any disclaimer, the term of this patent is extended or adjusted under 35 U.S.C. 154(b) by 0 days.

(21) Appl. No.: 14/129,375

(22) PCT Filed: Jun. 26, 2012

(86) PCT No.: PCT/KR2012/005037
§ 371 (c)(1), (2), (4) Date: Dec. 26, 2013

(87) PCT Pub. No.: WO2013/002535
PCT Pub. Date: Jan. 3, 2013

(65) Prior Publication Data
US 2014/0140906 A1    May 22, 2014

(30) Foreign Application Priority Data

Jun. 29, 2011 (KR) .......... 10-2011-0063918
Dec. 21, 2011 (KR) .......... 10-2011-0139034

(51) Int. Cl.
*A62D 3/38* (2007.01)
*C01D 1/36* (2006.01)

(52) U.S. Cl.
CPC ...................................... *C01D 1/36* (2013.01)

(58) Field of Classification Search
USPC .................................. 588/313, 320, 410, 901
See application file for complete search history.

(56) References Cited

FOREIGN PATENT DOCUMENTS

| | | |
|---|---|---|
| CN | 102050541 A | 5/2011 |
| KR | 100992117 B1 | 4/2010 |
| KR | 20110002233 A | 1/2011 |
| WO | 2011002138 A1 | 1/2011 |

OTHER PUBLICATIONS

PCT Application PCT/KR2012/005037, International Search Report dated Dec. 27, 2012 (6 pages).
Shih-Hsiung Sheu et al., "Treatment of Olefin Plant SpentCaustic by Combination of Neutralization and Fenton Reaction," Water Research. vol. 35, No. 8, Jun. 2001, pp. 2017-2021.
Nicolas Rodrigueza et al., "Spent Caustic Oxidation Using Electro-Generated Fenton's Reagent in a Batch Reactor," Journal of Environmental Science and Health, part A, vol. 43, No. 8, 2008, pp. 952-960.

*Primary Examiner* — Edward Johnson
(74) *Attorney, Agent, or Firm* — Abelman, Frayne & Schwab

(57) ABSTRACT

An embodiment of the present invention relates to a method for treating spent caustic soda generated from an oil refinery process, a petrochemical process, etc. through a process in which a series of treatment steps are integrated, wherein the method can constitute a process under mild conditions excluding high temperature and/or high pressure conditions and can be advantageous to a post treatment process since the amount of by-products is small.

26 Claims, 3 Drawing Sheets

TREATMENT METHOD FOR SPENT CAUSTIC SODA

RELATED APPLICATIONS

This application is a United States national phase application under 35 USC §371 of PCT/KR2012/005037 filed on Jun. 26, 2012, and claims the benefit under 35 USC §119 of Korean patent application number KR 10-2011-0063918 filed Jun. 29, 2011 and KR 10-2011-0139034 filed Dec. 21, 2011, the disclosures of which are incorporated herein by reference in their entireties.

TECHNICAL FIELD

The present invention relates to a method of treating spent caustic soda. More particularly, the present invention related to a method of treating spent caustic soda produced from an oil refining process, a petrochemical process or the like by a process integrated with a series of treatments.

BACKGROUND ART

Generally, in order to remove impurities, such as hydrogen sulfide, mercaptan (R—SH), organic acid and the like, included in the product generated from an oil refining process and a petrochemical process, the product makes contact with caustic soda (NaOH) or is scrubbed. Caustic soda (aqueous solution), which is a typical strong base, exists in a white translucent crystal state, has deliquescence absorbing moisture in air, and is used in the form of an aqueous solution in which caustic soda is dissolved in water. Particularly, caustic soda is steadily used as a primary reactant for removing impurities because it is effective at removing impurities as well as it is safe and economically efficient.

However, caustic soda having been used in removing impurities is converted into spent caustic soda. Spent caustic soda must be suitably treated because it is harmful to the human body. In particular, a spent caustic soda solution is difficult to be directly treated by a general biological wastewater disposal method because it has high pH, remarkably high biochemical oxygen demand (BOD), chemical oxygen demand (COD), total organic carbon (TOC) and the like.

Several methods have been proposed in order to treat such spent caustic soda. Among these methods, an incineration method is generally used. In the incineration method, the liquid components of a spent caustic soda solution are evaporated by burning fuel oil or the like to produce carbon dioxide, alkali metal carbonate and the like, and harmful components are removed by a disposal facility such as incinerator or the like and are then discharged to the atmosphere or the water system. However, this incineration method is disadvantageous in that its operation cost is high, and it causes air pollution during incineration.

Further, a wet air oxidation method is also known. In the wet air oxidation method, spent caustic soda is treated by bringing spent caustic soda into oxygen gas microbubbles to cause an oxidation reaction and then diffusing the condensed reaction product using bulk liquid. In this case, an organic material is converted into carbon dioxide and water, and an inorganic material (sulfide) is converted into thiosulfate or sulfate. However, the wet air oxidation method is problematic in that high investment cost is required because it needs a preheater, an oxidation reactor, a cooler and a separator.

Besides, when acidic oils (cresol-based oil, naphthenic base oil, etc.) included in the spent caustic soda discharged from an oil refining process and/or a petrochemical process are to be treated by the wet air oxidation method, reaction conditions (temperature and pressure) must be minutely controlled, and, particularly, high temperature and/or high pressure reaction conditions must be created according to the properties thereof, thus increasing cost.

Meanwhile, a Fenton oxidation treatment method using bivalent iron compounds (for example, ferrous sulfate ($FeSO_4$), iron chloride ($FeCl_2$), etc.) and hydrogen peroxide is also known. However, this Fenton oxidation treatment method is problematic in that a large amount of inorganic sludge is generated.

Recently, in oil refining and petrochemical plants, regulations for liquid or gaseous effluents causing air or water pollution have become stricter. Further, spent caustic soda is difficult to treat because it has high BOD and COD, so it is expressly provided in U.S. Resources Conservation and Recovery Act (RCRA) that spent caustic soda is defined as "D003 (reactive sulfide)".

Like this, spent caustic soda must be properly treated in order to observe the plant emission regulations. That is, a proper treatment method is required to be used in consideration of type and characteristics of spent caustic soda. Particularly, when spent caustic soda contains a comparatively large amount of phenol-based compounds (phenol, cresol, etc.) known as highly-dangerous carcinogenic substances, more careful attention is required.

Accordingly, a spent caustic soda treatment process, which is improved compared to conventional technologies, is required.

DISCLOSURE

Technical Problem

The present invention intends to provide a spent caustic soda treatment method, which can effectively remove various organic compounds contained in spent caustic soda and can minimize the generation of by-products because neutralization treatment (pH adjustment) and oxidation treatment steps are integrated with each other.

Technical Solution

A first aspect of the present invention provides a method of treating spent caustic soda, comprising the steps of: a) providing spent caustic soda generated from at least one of an oil refining process and a petrochemical process; b) adding an acid to the spent caustic soda to neutralize the spent caustic soda to a pH of about 1 to about 9 to separate the spent caustic soda into an upper-layer fraction and a lower-layer fraction by layer separation and then recovering the upper-layer fraction as a by-product; and c) oxidation-treating the lower-layer fraction in the presence of a trivalent iron-containing catalyst by the addition of an oxidant.

A second aspect of the present invention provides a method of treating spent caustic soda, comprising the steps of: a) providing spent caustic soda containing mercaptan in an amount less than the amount selected from about 150 to about 200 mg/L, the mercaptan being introduced during a procedure of treating a product obtained from at least one of an oil refining process and a petrochemical process with caustic soda; b) adding an acid to the spent caustic soda to neutralize the spent caustic soda to a pH of about 1 to about 5 to separate the spent caustic soda into an upper-layer fraction and a lower-layer fraction by layer separation and then recovering the upper-layer fraction as a by-product; and c) oxidation-treating the lower-layer fraction in the presence of a trivalent iron-containing catalyst by the addition of an oxidant.

A third aspect of the present invention provides a method of treating spent caustic soda, comprising the steps of: a) providing spent caustic soda containing mercaptan in an amount more than the amount selected from about 150 to about 200 mg/L, the mercaptan being introduced during a procedure of treating a product obtained from at least one of an oil refining process and a petrochemical process with caustic soda; b) adding an acid to the spent caustic soda to neutralize the spent caustic soda to pH of about 5 to about 9 to separate the spent caustic soda into an upper-layer fraction and a lower-layer fraction by layer separation and then recovering the upper-layer fraction as a by-product; and c) oxidation-treating the lower-layer fraction in the presence of a trivalent iron-containing catalyst by the addition of an oxidant.

The method according to the third aspect may further include the steps of: d) adding an acid to the oxidation-treated spent caustic soda to adjust the pH thereof to about 2 or less; and e) separating the pH-adjusted spent caustic soda of step d) into an upper-layer fraction and a lower-layer fraction by layer separation and then recovering the upper-layer fraction as a by-product.

The method according to an embodiment of the present invention may be applied to spent caustic soda containing phenol and/or naphthenic acid oil compounds.

In an embodiment of the present invention, the trivalent iron-containing catalyst may include iron oxide (ferric oxide ($Fe_2O_3$)).

In an embodiment of the present invention, the acid used to lower the pH of spent caustic soda may be sulfuric acid.

In an embodiment of the present invention, the oxidant used in the oxidation treatment may be hydrogen peroxide.

The method according to an embodiment of the present invention may further include the step of additionally treating the treated spent caustic soda using dissolved air flotation. If necessary, prior to the subsequent treatment, a base is added to adjust the pH of spent caustic soda to 6 to 8, specifically, about 7 to about 7.5 such that the subsequent treatment is suitably performed.

In an embodiment of the present invention, the oxidation treatment may be performed at a temperature of about 30 to about 90° C. and a pressure of about 1 to about 10 atm, specifically, at a temperature of about 40 to about 70° C. and a pressure of about 1 to about 3 atm, and the oxidation treatment time may be adjusted within a range of about 60 to about 420 min, specifically, about 90 to about 210 min.

However, in the second and third aspect, since the properties of the spent caustic soda to be oxidation-treated may be changed depending on the previous pH adjustment (neutralization) condition (for example, pH range), each of the oxidation treatment times in the second aspect and third aspect may be about 60 to about 240 min and about 60 to about 420 min, specifically, about 90 to about 180 min and about 180 to about 360 min.

Advantageous Effects

According to the spent caustic soda treatment method of the present invention, processes can be conducted under non-severe conditions not accompanying high-temperature and/or high-pressure conditions, and by-products are generated in small amounts, whereby this method can be advantageous to subsequent treatment processes. Particularly, according to this method, spent caustic soda containing a large amount of phenol compounds can also be efficiently treated, so this method can be widely used in treating spent caustic soda generated from various sources (oil refining process and/or petrochemical process).

For this reason, this method is advantageous compared to a conventional technology in which an oil refining process and a petrochemical process are separately conducted or spent caustic soda discharged from an oil refining process is additionally treated. Moreover, since the embodiments according to the second aspect and third aspect can be combined to be realized in one process, a switching operation can be conducted according to the properties and state of spent caustic soda, thereby assuring process flexibility.

BEST MODE

Figure 1:
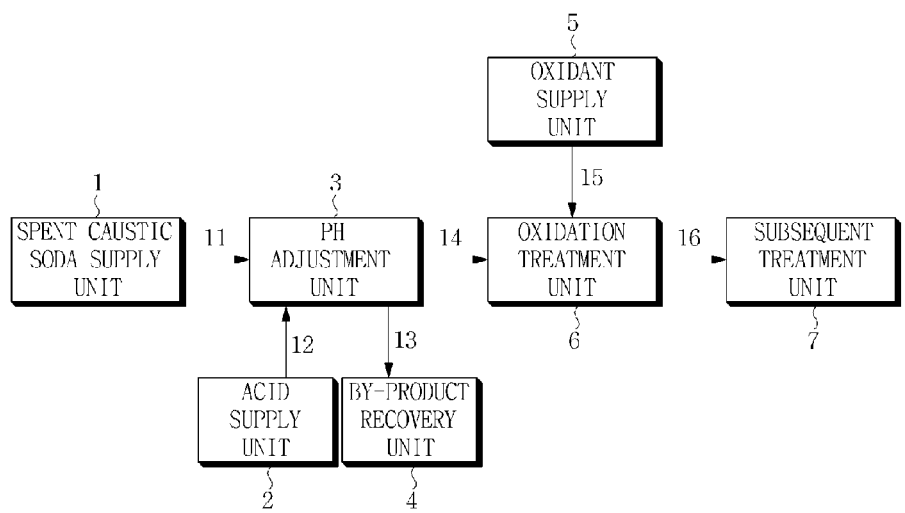
FIG. 1 is a schematic process view showing a method of treating spent caustic soda in order of steps of pH adjustment and oxidation treatment according to an embodiment of the present invention.

The present invention may be embodied in many different forms without departing from the spirit and significant characteristics of the invention. Therefore, the embodiments of the present invention are disclosed only for illustrative purposes and should not be construed as limiting the present invention.

The above and other objects, features and advantages of the present invention will be more clearly understood from the following detailed description taken in conjunction with the accompanying drawings.

The terms used herein are defined as follows.

COD (chemical oxygen demand) is a value obtained by converting the amount of a chemical oxidant ($KMnO_4$, $K_2Cr_2O_7$) required to chemically decompose and oxidize pollutants in water into the amount of oxygen.

BOD (biochemical oxygen demand) is an amount of oxygen required for the decomposition and oxidization of organic materials in water by aerobic microbes, the amount thereof being expressed by ppm, mg/L or the like. It means that the higher BOD, the higher the pollution level in waste water is.

A phenol compound is a compound in which a hydroxy group (OH—) is directly bonded to aromatic hydrocarbon. For example, the phenol compound is represented by Chemical Formula 1 below:

[Chemical Formula 1]

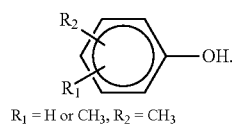

R₁ = H or CH₃, R₂ = CH₃

Examples of the phenol compounds may include phenol, cresol, dimethyl phenol and the like. Particularly, these phenol compounds are included in large amounts in cresyl-based spent caustic soda.

Naphthenic acid is a carboxylic acid (R—COOH), wherein R is a cycloalkyl of 5 to 6 carbon atoms or a derivative thereof, and is non-volatile. In the present specification, naphthenic acid may be a mixture of various naphthenic acids. Exemplary naphthenic acid may be represented by Chemical Formula 2 below:

[Chemical Formula 2]

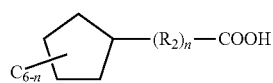

wherein $R_2$ is alkylene of 1 to 10 carbon atoms, and n is an integer of 7 to 30.

Mercaptan is a compound having a R—SH structure, and is an ingredient giving off a bad smell.

As described above, spent caustic soda is typically generated from an oil refining process and/or a petrochemical process. The generation sources thereof are exemplified in Table 1 below.

TABLE 1

| Class. | Generation process | Function of caustic soda |
|---|---|---|
| Oil refining process | Kero Merox process | Removal of H₂S and naphthenic acid from kerosene |
|  | LPG Merox process | Removal of H₂S and mercaptan from LPG |
|  | LSR Merox process | Removal of H₂S and mercaptan from gasoline |
|  | FCC process, GSU process | Removal of H₂S and mercaptan from gasoline |
| Petrochemical process | Naphtha cracking process | Removal of H₂S and CO₂ from naphtha |

As the above-mentioned generation source of spent caustic soda, for example, in the Merox process of the oil refining process, spent caustic soda may be prepared by the following Reaction Formulae 1 to 4:

[Reaction Formula 1]

[Reaction Formula 2]

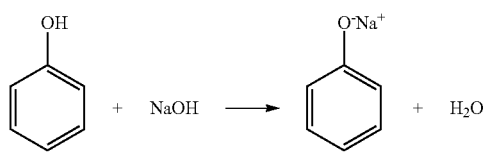

[Reaction Formula 3]

[Reaction Formula 4]

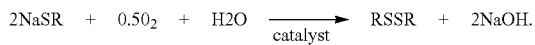

Like this, the kinds (types) of spent caustic soda are classified into three types, such as sulfurized spent caustic soda, naphthenic spent soda and cresylic spent caustic soda according to the kinds of main impurities (sulfide, naphthenic acid, cresylic acid, etc.) removed from hydrocarbons. The composition and concentration of spent caustic soda are varied depending on the kinds of plants.

As the sulfurized spent caustic soda, there may be exemplified spent caustic soda discharged from a naphtha cracking process as a petrochemical process and a LPG Merox process as an oil refining process. This sulfurized spent caustic soda contains Na₂S, NASR, NaSH and the like having characteristics of high COD and BOD. The naphthenic spent caustic soda contains a large amount of naphthenic acid, and has high COD and BOD. The cresylic spent caustic soda contains phenol, cresol and organic acid existing in the state of water-soluble cresylate.

The characteristics of flow of spent caustic soda discharged from an oil refining process are given in Table 2 below.

TABLE 2

| | Naphthene-based | | Cresylic acid-based | | Sulfide-based |
|---|---|---|---|---|---|
| | Jet oil/ kerosene | Diesel | Concentrated | Diluted | |
| NaOH (wt %) | 1-4 | 1-4 | 10-15 | 1-4 | 2-10 |
| Sulfide (wt %) | 0-0.1 | very small amount | 0-1 | 0-0.2 | 0.5-4 |
| Mercaptan (wt %) | 0-0.5 | 0-0.5 | 0-4 | 0-0.5 | 0.1-4 |
| Naphthenic acid (wt %) | 2-10 | 2-15 | — | — | — |
| Carbonate (wt %) | — | — | 0-0.5 | 0-0.1 | — |
| Cresylic acid (wt %) | 1-3 | 0-1 | 10-25 | 2-5 | 0-4 |
| Ammonia | — | — | — | — | very small amount |
| pH | 12-14 | 12-14 | 12-14 | 12-14 | 13-14 |

As given in Table 2 above, spent caustic soda may have a high pH value (for example, pH of about 12 to about 14, specifically around 13). Particularly, the spent caustic soda generated from an oil refining process may have a high COD level of about 65,000 mg/L or more, specifically, about 70,000 to about 94,000 mg/L. Further, the concentration of phenol in spent caustic soda may be about 2,000 to about 40,000 mg/L, specifically, about 2,000 to about 8,000 mg/L.

According to an embodiment of the present invention, acid is added to spent caustic soda to lower the pH of the spent caustic soda, thus separating the treated spent caustic soda into an upper-layer fraction and a lower-layer fraction. Since the above pH ranges from a strong acid to a base, the pH of spent caustic soda may be determined within the range of about 1 to about 9, specifically, about 2 to about 9 in consideration of the physical properties of the spent caustic soda, the characteristics of a neutralization titration curve depending on the addition of acid, the possibility of corrosion depending on the material of process equipment, the possibility of layer separation, and the possibility of overheating depending on heat of neutralization.

In the present invention, although the usage of various kinds of acids is not excluded, it is preferred that an acid be suitably selected, considering the difficulty in determining the material of a reactor depending on the corrosion of the reaction due to acid. In this point of view, it is preferred that sulfuric acid be used. Sulfuric acid may be used in the form of an undiluted solution (concentration: 98%), or, if necessary, a diluted aqueous solution.

As described later, organic compounds (components) existing in spent caustic soda can be separated (extracted), recovered or removed by the adjustment of pH attributable to the addition of acid. In this case, pH can be usefully used as an index for determining the amount of acid added. Specifically, when sulfuric acid is used as an acid, sodium mercaptide, sodium cresylate, sodium sulfide, sodium bisulfide and sodium naphthenate existing in spent caustic soda are converted by the following Reaction Formulae 5 to 9, respectively, through the neutralization reaction attributable to the addition of sulfuric acid.

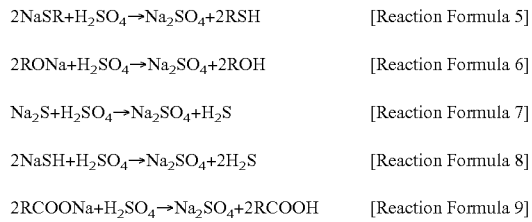

Typically, owing to the exothermic reaction characteristics of a pH adjustment (neutralization) reaction of spent caustic soda (solution type) attributable to acid treatment, as the pH adjustment reaction of spent caustic soda proceeds, the temperature thereof increases. In this case, for example, the temperature (for prevention of freezing) of spent caustic soda provided in the pH adjustment (neutralization) reaction may be about 5 to about 20° C., specifically, about 15 to about 20° C. Further, when the pH adjustment reaction proceeds at a desired level, the temperature of spent caustic soda may be about 40 to about 80° C., specifically, about 50 to about 70° C. However, the above temperature range is illustrative, and the temperature of spent caustic soda may be changed depending on the physical properties thereof.

As described above, in this embodiment, spent caustic soda is separated into an upper-layer fraction and a lower-layer fraction by adjusting the pH of spent caustic soda at a predetermined level while neutralizing the spent caustic soda with acid treatment. In this case, the upper-layer fraction, which can be obtained by layer separation, can be recovered as a kind of by-product, and exists in the form of a viscous brown liquid or emulsion having a similar smell to naphthenic acid, and is thus referred to as "red oil". The composition of red oil may be changed according to the type of spent caustic soda, and may include about 20 to about 30 wt % of light components having a boiling point of 230° C. or lower and about 70 to about 80 wt % of heavy components having a boiling point of higher than about 230° C. This numerical value range is illustrative, and the present invention is not limited thereto.

Most of the light components are phenol-based compounds (for example, phenol, cresol, and dimethyl phenol), and most of the heavy components are naphthenic acid-based mixtures having a molecular weight ($M_w$) of about 200 to about 400. Further, gaseous components, such as hydrogen sulfide and the like, produced in the neutralization procedure are discharged to the outside of a reaction system and then removed.

As such, the reason for separating red oil (mercaptan, naphthenic acid, phenol-based compound, etc.) as by-product from the neutralized product is that a catalyst is coated with oil components during a subsequent oxidation treatment process, thus preventing the oxidation reaction and/or the fluid flow in a catalyst from smoothly proceeding, and that a large amount of hydrogen peroxide must be used for subsequent oxidation treatment, thus increasing an operation cost and/or causing an operation obstruction. Besides, since these residual organic components act as toxic materials in a subsequent treatment procedure, for example a biological treatment procedure, these residual organic components are required to be removed to a predetermined level prior to oxidation treatment.

As described above, the upper-layer fraction (red oil) may be separated and recovered by a general layer separation method. For example, pH-adjusted (that is, neutralized) spent caustic soda (lower-layer fraction) having relatively large specific gravity is discharged first through one of pipes and valves provided at both lower ends of a reactor, and then residual upper-layer fraction, that is red oil, is discharged through the other pipe and the valve to be recovered.

According to an embodiment of the present invention, the amount of the upper-layer fraction (that is, red oil) separated from the pH-adjusted spent caustic sold (neutralized product) may be determined in consideration of the physical properties of spent caustic soda and the pH adjustment condition (neutralization reaction condition). For example, as described above, the pH adjustment procedure accompanies an exothermic reaction, and thus excessive temperature rise may be caused during the procedure of lowering pH. Considering this respect, red oil may be separated while performing the pH adjustment-separation procedures in a multistep manner according to circumstances.

Besides, the amount of the separated and recovered red oil may be about 0.02 to about 5 parts by volume, specifically, about 0.02 to about 2.5 parts by volume, and more specifically about 1.5 to about 2 parts by volume, based on 100 parts by volume of the total amount of spent caustic soda. Meanwhile, considering the treatment capacity and reaction condition of the subsequent oxidation treatment, the produced red oil with predetermined pH range may be separated (recovered) partially or to a maximum extent. This separated (recovered) red oil may be discarded (incinerated) later, or naphthenic acid may be separated therefrom to be reused as an antiseptic agent.

The spent caustic soda (that is, lower-layer fraction) remaining after the steps of neutralization (acid treatment) and separation (recovery) contains phenol-based compounds, naphthenic acid and other organic components as before. In this case, it is difficult to remove the organic components using a general water treatment process such as dissolved air flotation.

In this respect, according to another embodiment of the present invention, the oxidation treatment reaction is performed by supplying an oxidant in the presence of a catalyst containing trivalent iron.

In this case, the amount of phenol in the pH-adjusted spent caustic soda used in the oxidation treatment reaction may be varied depending on the physical properties of spent caustic soda discharged from an oil refining and/or petrochemical process. For example, the amount of phenol in the pH-adjusted spent caustic soda may be about 1000 to about 5500 mg/L, specifically, about 2,000 to about 4,500 mg/L. Further, for example, the COD of the pH-adjusted spent caustic soda may be about 10,000 to about 20,000 mg/L, specifically, about 10,000 to about 17,000 mg/L. This numerical value range may be changed depending on the physical properties of spent caustic soda and the previous step of the pH adjustment (neutralization) reaction condition.

Further, prior to the oxidation treatment reaction, the step of adjusting the pH of spent caustic soda to be advantageous to an oxidation reaction may further be selectively performed. For example, when the pH is adjusted very low (strong acid range) in the pH adjustment step, a suitable amount of a base component (for example, sodium hydroxide) is added to the pH-adjusted spent caustic soda to adjust the pH thereof in a pH range in which the oxidation reaction can be more effectively performed according to the characteristics of a catalyst, and then the oxidation treatment reaction may be performed. Conversely, when the pH thereof is adjusted relatively low, a suitable amount of an acid component (for example, sulfuric acid) is added to the pH-adjusted spent caustic soda in consideration of the subsequent oxidation treatment reaction conditions (characteristics of a catalyst, etc.), and then the oxidation treatment reaction may be performed.

In the embodiment of the present invention, organic components (particularly, phenol-based compounds) included in the pH-adjusted (neutralized) spent caustic soda (lower-layer fraction) remaining after the separation of red oil are oxidized by supplying an oxidant in the presence of a trivalent iron-containing catalyst. Like this, even after the separation of red oil, organic components, such as phenol-based compounds, which are difficult to treat, can be effectively removed by the subsequent oxidation treatment reaction.

According to the embodiment of the present invention, a trivalent iron-containing catalyst is used instead of a bivalent iron-containing catalyst (for example, ferrous sulfate, ferrous chloride or the like) used in the commonly known Fenton oxidation reaction. When this trivalent iron-containing catalyst is used, the pH range in which an oxidation reaction can occur is wide compared to when the bivalent-iron containing catalyst is used, so that process control is easy, the production of iron sludge can be remarkably reduced, and organic components, such as phenol-based compounds, which are difficult to treat, can be effectively oxidized and removed. That is, in the case of the bivalent iron-containing catalyst used in the conventional Fenton oxidation reaction, the activity in a reaction is reduced, so the pH of spent caustic soda is increased, and thus component of the bivalent iron-containing catalyst may be converted into insoluble iron hydroxide ($Fe(OH)_2$), thereby producing a large amount of iron sludge. In contrast, when the trivalent iron-containing catalyst is used according to an embodiment of the present invention, the problem of producing inorganic sludge can be overcome. In this regard, it is preferred that iron oxide ($Fe_2O_3$) be typically used as active component of the trivalent iron-containing catalyst. Thanks to this catalyst, an oxidant (particularly, hydrogen peroxide) can be converted into a radical having strong reactivity.

In the oxidation treatment reaction, when hydrogen peroxide is used as an oxidant, phenol and cresol are respectively converted by the following Reaction Formulae 10 and 11:

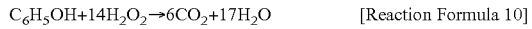  [Reaction Formula 10]

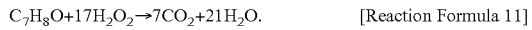  [Reaction Formula 11]

According to an embodiment of the present invention, the catalyst may be applied in various manners, such as trivalent iron-containing catalyst, support form, extrusion form and the like, and thus the present invention is not limited to predetermined forms. For example, an iron source or precursor (iron acetate, ammonium iron, iron chloride, iron oxalate, iron phosphate or the like) is reacted with a base (for example, sodium hydroxide) to be converted into iron hydroxide, and then this iron hydroxide is calcinated at high temperature (for example, about 500 to about 800° C.) to be converted into iron oxide ($Fe_2O_3$).

Generally, iron oxide has been used in the treatment of gaseous waste, and particularly can be usefully used in the oxidization and removal of phenol-based compounds in spent caustic soda. Meanwhile, in order to improve the activity or selectivity of a catalyst, at least one co-catalyst selected from alkali metals (potassium, sodium, etc), lanthanides (lanthanum, cerium, etc.) and metals having photocatalytic activity (titanium, tungsten, etc.) may be added in a small amount (for example, in an amount of 1 to 50 wt %, specifically, about 5 to about 40 wt % based on the total amount of the component having trivalent iron (typically, $Fe_2O_3$)). When a support is used, inorganic oxides (for example, silica, silica-alumina, zirconia, magnesia, etc.), which can be used as a general catalyst support, may be used independently or in a combination thereof, and may be mixed with a binder (alumina or the like) and then used in order to improve the formability of a catalyst.

In this case, the amount of an trivalent iron-containing component (particularly, iron oxide ($Fe_2O_3$)) in the catalyst may be about 20 to about 90 wt %, specifically about 30 to about 85 wt %, and more specifically about 50 to about 80 wt %. However, the amount thereof can be changed according to the process condition.

Meanwhile, according to an embodiment of the present invention, the trivalent iron-containing catalyst may have a density of about 1.1 to about 1.5 g/cm$^3$, a specific surface area of about 1 to about 6 m$^2$/g and a breaking strength of about 20 to about 40 N/mm. However, these numerical values is are illustrative, and the present invention is not limited thereto.

Meanwhile, in an embodiment of the present invention, the oxidation treatment reaction may be performed by a fixed bed method (catalyst size: about 3 to about 20 mm) This fixed bed method may be advantageous compared to a method of directly providing a catalytic component to an object in terms of the prevention of inactivation by the precipitation of a catalytic active metal, the regeneration of a catalyst, the necessity of additional treatment due to the generation of by-products, durability of a catalyst, the simplification of a process, and the like.

In the case of the fixed bed method, since air bubbles may be formed at the upper portion of a fixed bed during an oxidation reaction, the flow of an object may not be smooth when the object is passed from the upper portion thereof to the lower portion thereof. Therefore, the fixed bed may be configured such that the object is passed from the lower portion thereof to the upper portion thereof.

According to an embodiment of the present invention, organic components (particularly, phenol-based compounds) included in the neutralized spent caustic soda are additionally oxidized and removed by adding an oxidant. As the oxidant, hydrogen peroxide, ozone or the like may be used, and, preferably, hydrogen peroxide may be used. Particularly, when hydrogen peroxide is used as the oxidant, it may be used in the form of an aqueous solution in an amount of about 20 to about 50 wt %, specifically, about 25 to about 40 wt %.

In this embodiment, the amount of a catalyst for an oxidation reaction may be determined depending on the concentration of phenol-based compounds in spent caustic soda. For example, the ratio of $Fe^{3+}$/oxidant in the catalyst may be about 0.4 to about 10, specifically, about 0.4 to about 5, based on equivalence. Further, the usage of an oxidant may be determined depending on the physical properties of the neutralized reaction product. For example, the ratio of oxidant/COD (based on weight) may be about 1 to about 3, specifically, about 1.5 to about 2.5.

In this embodiment, the oxidation treatment reaction can be performed under a non-severe (mild) condition, and may be advantageous compared to a wet air oxidation method requiring high-temperature and/or high-pressure process conditions.

For example, the oxidation treatment reaction may be performed at a temperature of about 30 to about 90° C. and a pressure of about 1 to about 10 atms, specifically, at a temperature of about 40 to about 70° C. and a pressure of about 1 to about 3 atms, and the oxidation treatment time may be adjusted with the range of about 60 to about 420 min, specifically, about 90 to about 210 min.

Further, the process according to this embodiment may be a batch process or a continuous process. When it is required to apply it to various properties and states of spent caustic soda or to switch (convert) a process mode, a batch process may be adopted in order to secure process flexibility.

As described above, after the oxidation treatment, the pH of the resulting product may be adjusted in a range of about 6 to about 8, specifically, about 7 to about 7.5. This pH adjustment is performed in consideration of post-treatment processes, typically, a dissolved air flotation (DAF) process and a biological treatment process.

In relation to this, the typical post-treatment process "DAF" is configured such that, when air is sufficiently dissolved in water at high pressure and then injected into raw water to be treated, supersaturated air is formed into bubbles, and these bubbles are combined with flocs in the treated water to form a bubble-floc combination. This bubble-floc combination rapidly ascends to water surface to attain solid-liquid separation. In this case, this procedure induces a chemical reaction, and thus it is required to suitably adjust the pH range in order to really maximize the efficiency of a reaction. Like this, since the dissolved air flotation (DAF) process is sensitive to pH, it is required to adjust the pH in a neutral region. Further, even in the biological post-treatment process, since excessively low pH may cause the reduction in treatability of microbes, it is advantageous to adjust the pH in a neutral region.

Meanwhile, according to an embodiment of the present invention, considering the generation source of spent caustic soda, a process may be selected by dividing and setting the pH range in the above pH adjustment procedure. For example, as the typical generation source of spent caustic soda, the Kero Merox process is an exemplification. In the procedure of contacting or scrubbing caustic soda (aqueous solution) to remove naphthenic acid, mercaptan, phenol-based compounds and the like contained in kerosene separated according to boiling point in an crude distillation, as represented by Reaction Formulae 1 to 4, sodium naphenate, sodium mercaptide, sodium phenolate and the like are mixed with caustic soda to produce spent caustic soda.

In this case, when the amount of mercaptan (R—SH) introduced into the process of producing spent caustic soda is below a predetermined level (for example, selected in the range of about 150 to about 200 mg/L), high-concentration caustic soda may not be used, and, generally, the concentration of caustic soda in an aqueous solution is about 1 to about 4 wt %. Therefore, the concentration of caustic soda in spent caustic soda also becomes low. In contrast, when the amount of mercaptan (R—SH) introduced into this process is above a predetermined level, the activity of a catalyst used in the process (particularly, Merox process) may be rapidly deteriorated, so a comparatively high-concentration caustic soda (generally, the concentration of caustic soda in an aqueous solution is about 6 to about 10 wt %) is used in order to increase the activity of a catalyst, and this activation procedure is frequently performed. Therefore, the concentration of caustic soda in spent caustic soda becomes high.

Considering the above regards, in an embodiment of the present invention, an optimized process may be realized by dividing and setting the pH range in the above pH adjustment procedure.

First Aspect

In an embodiment of the present invention, in the step of adjusting the pH of spent caustic soda (that is, the amount of mercaptan introduced into the spent caustic soda is below a level selected in the range of about 150 to about 200 mg/L) using low-concentration caustic soda, the generation rate of reaction heat and vapor is relatively low, so the pH of spent caustic soda may be adjusted relatively low in order to sufficiently extract red oil. The pH thereof may be about 1 to about 5, specifically about 1 to about 3, and more specifically about 1.5 to about 2. In this embodiment, the amount of the separated and recovered red oil may be about 1 to about 5 parts by volume, specifically, about 1 to about 2.5 parts by volume, and more specifically about 1.5 to about 2 parts by volume, based on 100 parts by volume of the total amount of spent caustic soda.

In this embodiment, the amount of phenol in the spent caustic soda remaining after the pH adjustment and the red oil separation (that is, the pH-adjusted spent caustic soda introduced into the oxidation treatment reaction procedure) may be varied depending on the physical properties of the spent caustic soda discharged from an oil refining and/or petrochemical process. For example, the amount of phenol in the pH-adjusted spent caustic soda may be about 1,000 to about 4,000 mg/L, specifically, about 1,000 to about 3,000 mg/L. Further, for example, the COD of the pH-adjusted spent caustic soda may be about 10,000 to about 16,000 mg/L, specifically, about 10,000 to about 14,000 mg/L.

The pH-adjusted spent caustic soda is oxidation-treated. The oxidation treatment reaction of the pH-adjusted spent caustic soda may be performed at a temperature of about 30 to about 90° C. and a pressure of about 1 to about 10 atms, specifically at a temperature of about 40 to about 70° C. and a pressure of about 1 to about 3 atms, and more specifically at a temperature of about 50 to about 60° C. and a pressure of about 1 to about 2 atms, and the oxidation treatment time thereof may be about 60 to about 240 min, specifically, about 90 to about 180 min. As such, the oxidation reaction temperature and pressure conditions may be changed depending on the physical properties of the pH-adjusted spent caustic soda. However, the suitable oxidation reaction conditions of the pH-adjusted spent caustic soda may be deduced by an experiment for changing reaction conditions to attain desired phenol concentration.

In this aspect, the amount of phenol in the finally-obtained spent caustic soda may be about 500 mg/L or less, specifically, about 100 mg/L or less. Further, the COD thereof may be about 1,000 to about 5,000 mg/L, specifically, about 2,000 to about 3,500 mg/L.

Second Aspect

According to another embodiment of the present invention, in the step of adjusting the pH of spent caustic soda (that is, the amount of mercaptan introduced into the spent caustic soda is above a level selected in the range of about 150 to about 200 mg/L) using high-concentration caustic soda, reaction heat and vapor may be rapidly generated during the procedure of adjusting pH using acid, and thus the corrosion rate of the raw material (for example, iron) of a reactor due to acid and the damage rate of a coating material due to acid may be increased (the corrosion rate of the raw material a reactor due to acid is proportional to temperature). In order to overcome this problem, reaction heat may be lowered by slowly adding acid, but, in this case, it is difficult to treat a suitable amount of spent caustic soda because treatment time is relatively increased. Therefore, the pH of spent caustic soda may be about 5 to about 9, specifically about 6 to about 9, and more specifically about 7 to about 9. In this case, the amount of the separated and recovered red oil may be about 0.02 to about 0.05 parts by volume, specifically, about 0.02 to about 0.04 parts by volume, based on 100 parts by volume of the total amount of spent caustic soda.

In this embodiment, the amount of phenol in the spent caustic soda remaining after the pH adjustment and the red oil separation (that is, the pH-adjusted spent caustic soda introduced into the oxidation treatment reaction procedure) may be about 3,000 to about 5,000 mg/L, specifically, about 4,000 to about 4,500 mg/L. Further, for example, the COD of the pH-adjusted spent caustic soda may be about 14,000 to about 20,000 mg/L, specifically, about 14,000 to about 17,000 mg/L.

Further, the oxidation treatment reaction of the pH-adjusted spent caustic soda may be performed at a temperature of about 30 to about 90° C. and a pressure of about 1 to about 10 atms, specifically at a temperature of about 40 to about 70° C., and more specifically at a temperature of about 45 to about 65° C. and a pressure of about 1 to about 3 atms, and the oxidation treatment reaction time thereof may be about 60 to about 420 min, specifically, about 180 to about 360 min.

As described above, in this aspect, it is possible to prevent the excessive generation of reaction heat and vapor (gas) and the deterioration of operation stability due to the excessive generation thereof occurring when the pH of spent caustic soda is rapidly lowered during the pH adjustment procedure. However, since the degree of reduction of pH is low in the pH adjustment procedure, organic materials, particularly, phenol compounds produced by a subsequent oxidation treatment reaction may be insufficiently removed, compared to in the above-mentioned first aspect.

In this case, the amount of phenol in the pH-adjusted spent caustic soda (that is, lower-layer fraction) introduced into the oxidation treatment reaction may be a predetermined level or more (for example, about 5,000 mg/L or more). In this case, in the procedure of oxidation treatment, hydrogen peroxide may be used in a large amount in proportion to phenol concentration. As a result, oxidation reaction time increases, or a foaming phenomenon occurs in proportion to the usage of hydrogen peroxide, thus obstructing a process operation. Therefore, only a predetermined amount of spent caustic soda is oxidized by hydrogen peroxide, and residual spent caustic soda is oxidized to a pH of about 2 or less, specifically about 1 to about 2 by the addition of acid (the foaming phenomenon may also be removed in the pH adjustment procedure), and then red oil is separated, thereby additionally removing phenol components. Of course, according to circumstances, even when the amount of phenol in the pH-adjusted spent caustic soda exceeds the above-mentioned level, the subsequent pH adjustment procedure may be omitted by adjusting the oxidation treatment conditions.

Thereafter, residual lower-layer fraction may be sent to a subsequent treatment process (for example, DAF).

As described above, two-step pH adjustment procedure is introduced. In the first step, a small amount of red oil is separated and recovered, and then an oxidation treatment reaction is performed. Thereafter, in the second step, red oil is additionally separated and recovered. In this case, the amount of organic components (phenol compounds and/or naphthenic acid compounds) is considerably reduced, thus decreasing the total generation amount of red oil. For example, when a two-step pH adjustment procedure is accompanied, the amount of finally-recovered red oil may be about 0.01 to about 0.1 parts by volume, specifically, about 0.01 to about 0.05 parts by volume, based on 100 parts by volume of the total amount of spent caustic soda. Therefore, the produced red oil may be separated partially or in a maximum amount.

In this aspect, the amount of phenol in the finally-obtained spent caustic soda may be about 1000 mg/L or less, specifically, about 700 mg/L or less. Further, the COD thereof may be about 2,000 to about 7,000 mg/L, specifically, about 4,000 to about 7,000 mg/L.

According to an embodiment of the present invention, when a trivalent iron-containing catalyst is used in the oxidation treatment reaction, the following advantages can be obtained.

That is, since sludge is not excessively formed during the oxidation reaction, it is easy to perform a subsequent process.

In contrast, when a generally-known bivalent iron-based catalyst is used, sludge is excessively formed, and thus it is substantially difficult to perform a subsequent neutralization reaction. In the pH range in which an oxidation reaction is easily performed, the pH range of bivalent iron is about 2 to about 4, but the pH range of trivalent iron is widened to about 1 to about 9. Therefore, as described above, spent caustic soda can be treated by a two-mode operation, and it is advantageous in terms of process operation efficiency. Particularly, since the pH range in which an oxidation reaction catalyst has activity is wide, it is possible to overcome the problem caused by excessively lowering the pH in the pH adjustment procedure prior to the oxidation reaction.

FIG. 1 is a schematic process view showing a method of treating spent caustic soda according to an embodiment of the present invention.

Spent caustic soda discharged from an oil refining process and/or a petrochemical process is transferred to a pH adjustment unit (neutralization unit) 3 through a line 11. The spent caustic soda may be separately stored and then supplied to the pH adjustment unit 3 from a spent caustic supply unit 1, but, if necessary, may be directly supplied to the pH adjustment unit 3 from an oil refining process or a petrochemical process.

Sulfuric acid (typically, an aqueous solution containing about 98 wt % of sulfuric acid) is supplied to the pH adjustment unit 3 from an acid supply unit 2 through a line 12. The supplied spent caustic soda and sulfuric acid are mixed with each other to cause a neutralization reaction, and the temperature in the pH adjustment unit 3 is increased by the heat of the neutralization reaction. According to circumstances, excessive temperature rise can be prevented by a heat exchanger or a cooling jacket (not shown). As the neutralization reaction proceeds and the pH of spent caustic soda is decreased, sodium phenolate, sodium cresylate, sodium naphthenate existing in spent caustic soda are respectively converted into phenol, cresol and naphthenic acid (red oil), and, simultaneously, a gaseous component such as hydrogen sulfide is discharged to the outside through an exhaust port (not shown) provided in the pH adjustment unit 3.

As the result of the pH adjustment (neutralization) of spent caustic soda, an upper-layer fraction and a lower-layer fraction are formed. Here, the upper-layer fraction is separated as red oil by layer separation, and is then transferred to a by-product (red oil) recovery unit 4 via an outlet provided in the pH adjustment unit 3 through a line 13, and residual spent caustic soda (lower-layer fraction) is transferred to an oxidation treatment unit 6 through a line 14 connected with another outlet provided in the pH adjustment unit 3. That is, since the red oil (upper-layer fraction: 13) and pH-adjusted spent caustic soda (lower-layer fraction: 14) are easily separated from each other because of specific gravity difference, they can be respectively separated, and the recovered red oil can be discarded or can be retreated for the purpose of extracting naphthenic acid.

In this embodiment shown in FIG. 1, the oxidation treatment unit 6 is provided therein with a fixed bed made of iron oxide ($Fe_2O_3$), and an oxidant, preferably, an aqueous hydrogen peroxide solution is supplied to the oxidation treatment unit 6 from an oxidant supply unit 5 through a line 15. Due to the addition of the oxidant, organic components, particularly, phenol-based compounds are converted into carbon dioxide in the presence of a trivalent iron-containing catalyst. The carbon dioxide generated in the oxidation treatment unit 6 is transferred to the pH adjustment unit 3 and then discharged to the outside. The oxidation-treated spent caustic soda is transferred to a subsequent treatment unit 7 such as a dissolved air flotation process through a line 16 and then additionally treated. However, prior to the subsequent treatment unit 7, organic components, which were not converted into carbon dioxide in the oxidation treatment unit 6, may be additionally removed by an coagulation treatment process (not shown), thus reducing the load of the subsequent treatment unit 7. The coagulation treatment process is well known to those skilled in the art. In the coagulation treatment process, organic components are coagulated by treating them with $Al^{3+}$ to form floating materials, and these floating materials are removed. Particularly, it is advantageous in that $Fe^{3+}$ partially eluted from the trivalent iron-containing catalyst used in the oxidation treatment process functions as a coagulant together with $Al^{3+}$.

Figure 2:
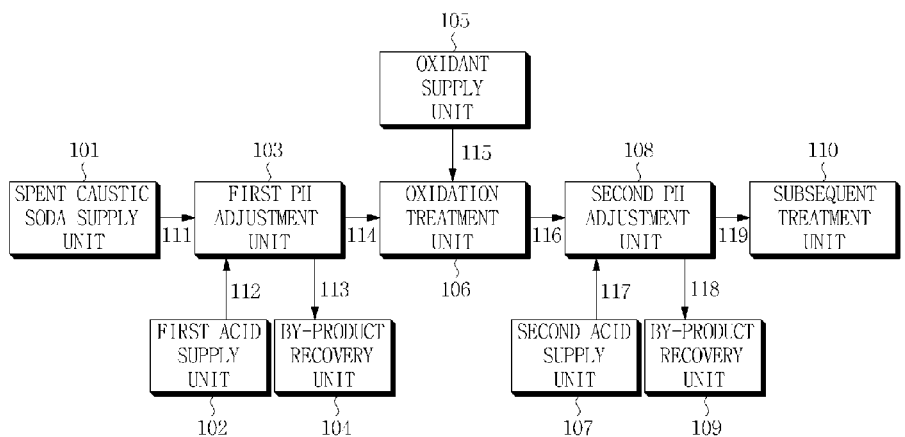
FIG. 2 is a schematic process view showing a method of treating spent caustic soda in order of steps of first pH adjustment, oxidation treatment and second pH adjustment according to another embodiment of the present invention.

FIG. 2 is a schematic process view showing a method of treating spent caustic soda (two-step ph adjustment process) according to another embodiment of the present invention.

Spent caustic soda discharged from an oil refining process and/or a petrochemical process is transferred to a first pH adjustment unit (first neutralization unit) 103 through a line 111. As described above, the spent caustic soda may be separately stored and then supplied to the first pH adjustment unit 103 from a spent caustic supply unit 101, but, if necessary, may be directly supplied to the first pH adjustment unit 103 from an oil refining process or a petrochemical process. Further, an acid (for example, sulfuric acid) is supplied to the first pH adjustment unit 103 from a first acid supply unit 102 through a line 112. In this case, the pH of spent caustic soda is adjusted from about 5 to about 9, specifically, about 6 to about 9. As a result, an upper-layer fraction and a lower-layer fraction are formed. Here, the upper-layer fraction is separated as red oil by layer separation, and is then transfer to a by-product (red oil) recovery unit 104 via an outlet provided in the first pH adjustment unit 103 through a line 113, and residual spent caustic soda (lower-layer fraction) is transferred to an oxidation treatment unit 106 through a line 114 connected with another outlet provided in the first pH adjustment unit 103.

The oxidation treatment unit 106 is provided therein with a fixed bed made of iron oxide ($Fe_2O_3$), and an oxidant, preferably, an aqueous hydrogen peroxide solution is supplied to the oxidation treatment unit 106 from an oxidant supply unit 105 through a line 115. Due to the addition of the oxidant, organic components, such as phenol-based compounds, are converted into carbon dioxide in the presence of a trivalent iron-containing catalyst. The carbon dioxide generated in the oxidation treatment unit 106 is transferred to the first pH adjustment unit 3 and the following second pH adjustment unit 108 and then discharged to the outside.

The oxidation-treated spent caustic soda is transferred to a second pH adjustment unit (second neutralization unit) 108 through a line 116. An acid is supplied to the second pH adjustment unit 108 from a second acid supply unit 107 through a line 117 to adjust the pH of the oxidation-treated spent caustic soda to about 2 or less, specifically, about 1 to about 2. In the embodiment shown in FIG. 2, the first acid supply unit 102 and the second acid supply unit 107 are separately shown, but an acid may be supplied from a single acid supply unit through line connection. Further, acids supplied from the first acid supply unit 102 and the second acid supply unit 107 may be different from each other, and the physical properties (for example, concentration) of supplied acids may also be different from each other.

An upper-layer fraction (red oil) and a lower-layer fraction are formed by the neutralization reaction. The upper-layer fraction (red oil) and the lower-layer fraction are respectively separated by layer separation. Here, upper-layer fraction (red oil) is transferred to a by-product (red oil) recovery unit 109 via an outlet provided in the second pH adjustment unit 108 through a line 118, and residual spent caustic soda (lower-layer fraction) is transferred to a subsequent treatment unit 110 through a line 119.

According to a further embodiment of the present invention, the method of treating spent caustic soda may be constituted by combining a plurality of modes in a single process according to the physical properties of spent caustic soda which is to be treated. That is, the modes (i) pH adjustment (pH: about 1 to about 5)→oxidation treatment and (ii) pH adjustment (pH: about 5 to about 9)→oxidation treatment or first pH adjustment (pH: about 5 to about 9)→oxidation treatment→second pH adjustment (pH: about 2 or less) may be alternated or switched by valve operation. As such, processes for integrally performing a plurality of modes will be illustrated by the following Examples.

MODE FOR INVENTION

Hereinafter, the present invention will be described in more detail with reference to the following Examples. However, these Examples are set forth to illustrate the present invention, and the scope of the present invention is not limited thereto.

Example 1

(1) Physical Properties of Caustic Soda

Spent caustic sodas used in this Example are two types of spent caustic sodas, and are produced from a KMX (Kero Merox) process licensed by Merichem and UOP. The physical properties thereof are given in Tables 3 and 4 below.

TABLE 3

| Temp. (°C.) | pH | NaOH (wt %) | $COD_{Mn}$ (mg/L) | $COD_{Cr}$ (mg/L) | $BOD_5$ (mg/L) | Phenol (mg/L) | Mercaptan (mg/L) | Specific gravity |
|---|---|---|---|---|---|---|---|---|
| 17 | 13 | 3.5 | 26,000 | 76,000 | 19,500 | 4,000 | 163 | 1.15 |

TABLE 4

| Temp. (°C.) | pH | NaOH (wt %) | $COD_{Mn}$ (mg/L) | $COD_{Cr}$ (mg/L) | $BOD_5$ (mg/L) | Phenol (mg/L) | Mercaptan (mg/L) | Specific gravity |
|---|---|---|---|---|---|---|---|---|
| 17 | 13 | 6 | 73,000 | 100,500 | 26,300 | 7,350 | 231 | 1.21 |

2) Materials Used in this Example as Follows

1) Sulfuric acid (Aldrich Corp, concentration: 98 w %
2) Sodium hydroxide (Aldrich Corp, solution containing 50 wt % of sodium hydroxide, which was prepared by diluting sodium hydroxide with distilled water)
3) Hydrogen peroxide (Aldrich Corp, solution containing 33 wt % of hydrogen peroxide)
4) As an oxidation catalyst, a commercially-available spherical catalyst containing iron oxide (III) (main component) and about 20 to about 30 wt % of potassium and about 20 to about 30 wt % of cerium oxide based on the weight of the iron oxide and having a particle diameter of about 1 mm was prepared. The physical properties thereof are given in Table 5 below.

TABLE 5

| $Fe_2O_3$ (wt %) | Density (g/cm$^3$) | Specific surface area (m$^2$/g) | Breaking strength (N/mm) |
|---|---|---|---|
| >70 | 1.36 | 3 | 25 |

4. Test Procedure

Testing Apparatus

Figure 3:
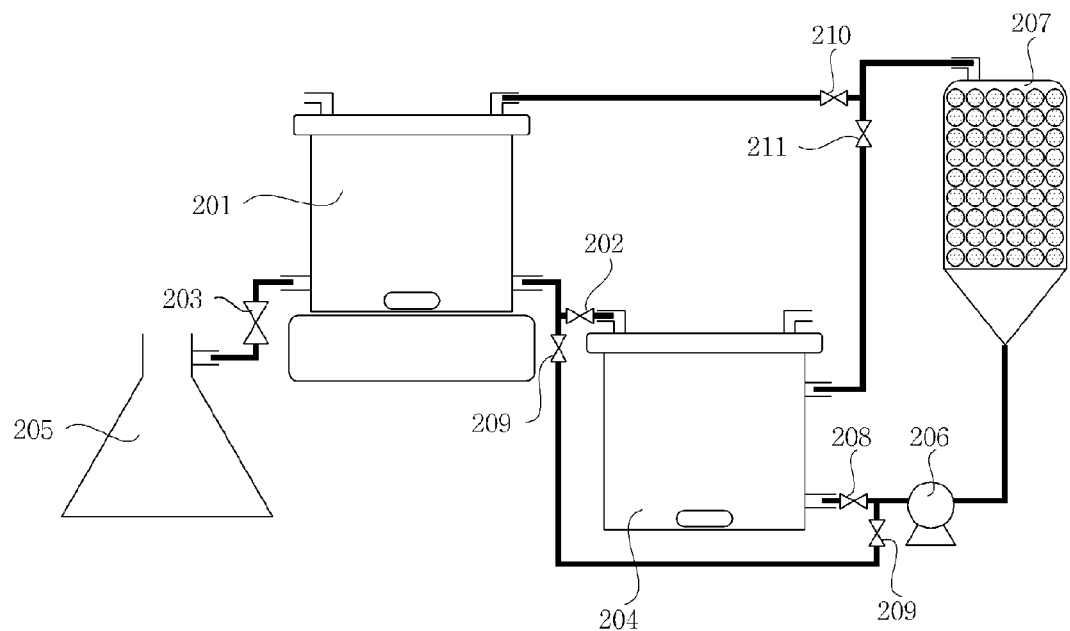
FIG. 3 is a schematic view showing a testing apparatus used in Examples 1 and 2 and Comparative Example 2.

In this Example, a testing apparatus shown in FIG. 3 was used. In FIG. 3, a first container 201, a second container 204, a third container 205 and a fourth container 207 were made of Pyrex, and their respective volumes were about 2.5 L, about 2.5 L, about 2 L and about 50 mL. The fourth container 207 is filled with about 7.5 g of a spherical iron oxide (III)-based catalyst.

(1) Test 1

About 700 mL of spent caustic soda given in Table 3 above was introduced into a first container 201 and then stirred at a rotation speed of about 150 rpm. The initial pH of spent caustic soda was measured using a pH meter, and the pH change thereof was observed while injecting sulfuric acid using a dropping pipette. Sulfuric acid was injected until the pH reached about 2, and then the stirring was stopped, and the spent caustic soda was left for about 0.5 hr until it was separated into red oil (upper layer) and the pH-adjusted spent caustic soda (lower layer). After the layer separation between the red oil and the pH-adjusted (neutralized) spent caustic soda was confirmed, a valve 202 was opened, and a valve 203 was closed to transfer the pH-adjusted spent caustic soda (lower layer) to a second container 204.

After the pH-adjusted spent caustic soda (lower layer) was completely transferred to the second container 204, the valve 202 was closed, and the valve 203 was opened to transfer the red oil (upper layer) to a third container 205. In this case, the amount of the transferred red oil was about 2 vol % based on the total volume of the spent caustic soda.

Thereafter, the pH-adjusted spent caustic soda was stirred in the second container 204, and a valve 208 and a valve 211 were opened and a valve 209 and a valve 210 were closed while operating a pump 206, thus circulating the pH-adjusted spent caustic soda between the second container 204 and the fourth container 207. Then, about 25 mL of hydrogen peroxide was injected into the second container 204 using a dropping pipette to cause an oxidation reaction. The oxidation reaction was performed at a temperature of about 55° C. and normal pressure for about 120 min. In this case, the ratio of oxidant:COD (based on weight) was about 2:1. After the oxidation reaction was finished, sodium hydroxide was injected thereto using a dropping pipette to adjust the pH of the spent caustic soda to about 7.

(2) Test 2

About 700 mL of spent caustic soda given in Table 4 above was introduced into a first container 201 and then stirred at a rotation speed of about 150 rpm. The initial pH of the spent caustic soda was measured using a pH meter, and the pH change thereof was observed while injecting sulfuric acid using a dropping pipette. Sulfuric acid was injected until the pH reached about 6.5, and then the stirring was stopped, and the spent caustic soda was left for about 0.5 hr until it was separated into red oil (upper layer) and pH-adjusted spent caustic soda (lower layer). After the layer separation between the red oil and the pH-adjusted (neutralized) spent caustic soda was confirmed, a valve 202 was opened, and a valve 203 was closed to transfer the pH-adjusted spent caustic soda (lower layer) to a second container 204. In this case, the content of phenol in the pH-adjusted spent caustic soda was about 4,380 mg/L.

After the pH-adjusted spent caustic soda (lower layer) was completely transferred to the second container 204, the valve 202 was closed, and the valve 203 was opened to transfer the red oil (upper layer) to a third container 205. In this case, the amount of the transferred red oil was about 0.03 vol % based on the total volume of the spent caustic soda.

Thereafter, the pH-adjusted spent caustic soda was stirred in the second container 204, and a valve 208 and a valve 211 were opened and a valve 209 and a valve 210 were closed while operating a pump 206, thus circulating the pH-adjusted spent caustic soda between the second container 204 and the fourth container 207. Then, about 35 mL of hydrogen peroxide was injected into the second container 204 using a dropping pipette to cause an oxidation reaction. The oxidation reaction was performed at a temperature of about 55° C. and normal pressure for about 120 min. In this case, the ratio of oxidant:COD (based on weight) was about 2:1. After the oxidation reaction was finished, sodium hydroxide was injected thereto using a dropping pipette to adjust the pH of the spent caustic soda to about 7.

(3) Test 3

About 700 mL of spent caustic soda given in Table 4 above was introduced into a first container 201 and then stirred at a rotation speed of about 150 rpm. The initial pH of spent caustic soda was measured using a pH meter, and the pH change thereof was observed while injecting sulfuric acid using a dropping pipette. Sulfuric acid was injected until the pH reached 6.5, and then the stiffing was stopped, and the spent caustic soda was left for about 0.5 hr until it was separated into red oil (upper layer) and pH-adjusted spent caustic soda (lower layer). After the layer separation between the red oil and the pH-adjusted (neutralized) spent caustic soda was confirmed, a valve 202 was opened, and a valve 203 was closed to transfer the pH-adjusted spent caustic soda (lower layer) to a second container 204. In this case, the content of phenol in the pH-adjusted spent caustic soda was measured using a water quality analysis kit of HUMAS Corporation. As a result, the content thereof was about 5,410 mg/L.

After the pH-adjusted spent caustic soda (lower layer) was completely transferred to the second container 204, the valve 202 was closed, and the valve 203 was opened to transfer the red oil (upper layer) to a third container 205. In this case, the amount of the transferred red oil was 0.04 vol % based on the total volume of the spent caustic soda.

Thereafter, a valve 208 and a valve 210 were opened and a valve 209 and a valve 211 were closed while operating a pump 206, thus transferring the pH-adjusted spent caustic soda to the first container 201. Then, the operation of the pump 206 was stopped.

Again, after the pH-adjusted spent caustic soda was stirred in the first container 201, a valve 202 and a valve 208 were closed, and a valve 209 was opened, and then the pump 206 was operated to circulate the pH-adjusted spent caustic soda between the first container 201 and the fourth container 207. Then, about 35 mL of hydrogen peroxide was injected into the first container 201 using a dropping pipette to cause an oxidation reaction. The oxidation reaction was performed at a temperature of about 55° C. and normal pressure for about 120 min. In this case, the ratio of oxidant:COD (based on weight) was about 2:1. After the oxidation reaction was finished, the valve 202, the valve 209 and the valve 203 were closed, and then sulfuric acid was injected until the pH reaches about 2, and then the stiffing was stopped, and the spent caustic soda was left for about 0.5 hr until it was separated into red oil (upper layer) and pH-adjusted spent caustic soda (lower layer). Thereafter, the valve 202 was opened, and the valve 203 was closed to transfer the pH-adjusted spent caustic soda (lower layer) to the second container 204.

After the pH-adjusted spent caustic soda (lower layer) was completely transferred to the second container 204, the valve 202 was closed, and the valve 203 was opened to additionally transfer the red oil (upper layer) to a third container 205. In this case, the amount of the transferred red oil was about 0.01 vol % based on the total volume of the spent caustic soda.

The pH-adjusted spent caustic soda was stirred in the second container 204, and sodium hydroxide was injected using a dropping pipette to adjust the pH of the spent caustic soda to 7.

The contents of phenol in the spent caustic sodas treated according to Tests 1 to 3 and the CODs thereof are given in Tables 6 to 8 below.

TABLE 6

| | Test 1 | | | | | | | | | |
|---|---|---|---|---|---|---|---|---|---|---|
| Number of times | 1 | 2 | 3 | 4 | 5 | 6 | 7 | 8 | 9 | 10 |
| Phenol (mg/L) | 3 | 12 | 8 | 4 | 6 | 15 | 13 | 11 | 9 | 7 |
| COD (mg/L) | 2459 | 4731 | 3864 | 2564 | 3125 | 4853 | 4835 | 4158 | 3968 | 3953 |

TABLE 7

| | Test 2 | | | | | | | | | |
|---|---|---|---|---|---|---|---|---|---|---|
| Number of times | 1 | 2 | 3 | 4 | 5 | 6 | 7 | 8 | 9 | 10 |
| Phenol (mg/L) | 568 | 450 | 652 | 430 | 456 | 325 | 431 | 257 | 324 | 421 |
| COD (mg/L) | 6871 | 5763 | 7834 | 5342 | 5479 | 5047 | 5479 | 4979 | 5831 | 5324 |

TABLE 8

| | Test 3 | | | | | | | | | |
|---|---|---|---|---|---|---|---|---|---|---|
| Number of times | 1 | 2 | 3 | 4 | 5 | 6 | 7 | 8 | 9 | 10 |
| Phenol (mg/L) | 357 | 412 | 563 | 542 | 481 | 493 | 390 | 413 | 434 | 520 |
| COD (mg/L) | 5032 | 5867 | 7965 | 7654 | 5436 | 5531 | 4765 | 5964 | 5934 | 7103 |

5. Formation of Sludge

In the Tests 1 to 3, sludge was scarcely formed to such a degree that it cannot be measured.

As described above, in the case where oxidation treatment is performed after pH adjustment, it can be ascertained that the content of phenol can be remarkably lowered. However, in the case of Test 2, the content of phenol is high compared to that in Test 1, but, in this case, a subsequent process can be sufficiently performed, and thus the present invention is advantageous compared to conventional technologies. Meanwhile, it was ascertained in the Tests 1 to 3 that the generation of reaction heat and vapor (gas) was relatively reduced, and thus it was ascertained that the present invention is advantageous in terms of operation stability. Particularly, in the Test 3, it is noticed that the total production of red oil is remarkably low compared to that in the Test 1 even though a two-step pH adjustment procedure is performed.

Example 2

Influence of Phenol Concentration on Oxidation Reaction Temperature and Hydrogen Peroxide Injection Dosage Spent caustic soda was treated in the same manner as in Test 1 of Example 1, except that this treatment was performed while changing oxidation reaction temperature and hydrogen peroxide injection dosage. A reaction temperature before oxidation reaction is set as operation variable, and the others are set as independent variables. The concentration of phenol is measured using water analysis kit of HUMAS. When concentration of phenol is higher than about 2,000 mg/L, distilled water is added. When concentration of phenol is lower than about 2,000 mg/L, phenol solution is added. Thus, the contents of phenol in pH-adjusted spent caustic soda are regulated to about 2,000 mg/L. The contents of phenol in the finally-treated spent caustic soda are given in Tables 9 and 10 below (average value of ten times).

TABLE 9

Phenol concentration (mg/L, hydrogen peroxide (aqueous solution) injection dosage: 20 mL)

| Reaction temperature | time (min) | | | | |
|---|---|---|---|---|---|
| | 0 | 30 | 60 | 90 | 120 |
| 45° C. | 2000 | 1700 | 1600 | 1520 | 1460 |
| 50° C. | 2000 | 1200 | 850 | 400 | 300 |
| 55° C. | 2000 | 950 | 400 | 0 | 0 |

TABLE 10

Phenol concentration (mg/L, hydrogen peroxide (aqueous solution) injection dosage: 10 mL)

| Reaction temperature | time (min) | | | | |
|---|---|---|---|---|---|
| | 0 | 30 | 60 | 90 | 120 |
| 45° C. | 2000 | 1700 | 1600 | 1600 | 1600 |
| 50° C. | 2000 | 1300 | 1250 | 1200 | 1200 |
| 55° C. | 2000 | 1200 | 1100 | 1050 | 950 |

As given in Tables 9 and 10 above, it can be seen that phenol concentration was decreased depending on the increase of hydrogen peroxide injection dosage. Further, it can be seen that the equivalent ratio of $Fe^{3+}$/hydrogen peroxide was 1.1 when the injection dosage of hydrogen peroxide was 20 mL, whereas the equivalent ratio of $Fe^{3+}$/hydrogen peroxide was about 0.57 when the injection dosage of hydrogen peroxide was 10 mL.

Meanwhile, it can be ascertained that phenol was converted at a ratio of 100% when 2000 mg/L of spent caustic soda was reacted at about 55° C. for about 90 min. Therefore, it can be determined that it is suitable to react spent caustic soda at about 50° C. or higher under the above condition.

Example 3

Influence of Hydrogen Peroxide Injection Dosage on COD

Spent caustic soda was treated in the same manner as in Tests 1 and 2 of Example 1, except that the injection dosage of hydrogen peroxide (aqueous solution), which is an oxidant used in oxidation treatment reaction, was changed. The results thereof are given in Tables 11 and 12 below.

TABLE 11

| | Injection dose of hydrogen peroxide | | | | | | | |
|---|---|---|---|---|---|---|---|---|
| | 10 | 15 | 20 | 25 | 30 | 35 | 40 | 45 |
| COD (mg/L) | 3317 | 3134 | 2653 | 2167 | 2256 | 2890 | 3420 | 4590 |

As given in Table 11 above, it can be ascertained that the optimal injection dosage of an oxidant (hydrogen peroxide was about 25 mL based on about 700 mL of spent caustic soda. In this case, the ratio of oxidant:COD (based on weight) was about 2:1. Particularly, it is determined that COD is increased due to residual unreacted hydrogen peroxide when hydrogen peroxide is injected in an amount of more than about 25 mL.

TABLE 12

| | Injection dose of hydrogen peroxide | | | | | | | |
|---|---|---|---|---|---|---|---|---|
| | 10 | 15 | 20 | 25 | 30 | 35 | 40 | 45 |
| COD (mg/L) | 9000 | 8400 | 7900 | 7200 | 6400 | 5900 | 6100 | 6400 |

As given in Table 12 above, it can be ascertained that the optimal injection dosage of an oxidant (hydrogen peroxide was about 35 mL based on about 700 mL of spent caustic soda. In this case, the ratio of oxidant:COD (based on weight) was about 2:1. Particularly, it is determined that COD is increased due to residual unreacted hydrogen peroxide when hydrogen peroxide is injected in an amount of more than 35 mL.

As described above, in the case of this Example, it is preferred that the ratio of oxidant (oxidant for oxidation reaction):COD (COD of spent caustic soda right before oxidation treatment) be adjusted to about 2:1.

Comparative Example 1

Spent caustic soda was treated in the same manner as in Example 2, except that a catalyst was not used (injection dosage of hydrogen peroxide: about 25 mL). Here, oxidation reaction time was about 2 hr. As a result, it was ascertained that only about 8% of phenol was converted. Therefore, it can be ascertained that the conversion rate of phenol in Comparative Example 1 is remarkably low compared to when the catalyst given in Table 9 above was used (oxidation reaction time: about 90 min, conversion rate of phenol: about 100%).

Comparative Example 2

Spent caustic soda was treated in the same manner as in Test 1 of Example 1, except that pH-adjusted spent caustic soda was transferred to a fourth container 207 and was then oxidation-treated without separating and recovering red oil.

Specifically, about 700 mL of spent caustic soda was introduced into a first container 201 and then stirred at a rotation speed of about 150 rpm. The initial pH of spent caustic soda was measured using a pH meter, and the pH change thereof was observed while injecting sulfuric acid using a dropping pipette. Sulfuric acid was injected until the pH reaches 2, and then the stirring was stopped. Thereafter, a valve 202 was opened, and a valve 209 was closed to transfer the pH-adjusted spent caustic soda to a second container 204.

When the pH-adjusted spent caustic soda was completely transferred to the second container 204, the pH-adjusted spent caustic soda was stirred, and sodium hydroxide was injected thereto using a dropping pipette to adjust the pH of the spent caustic soda to about 3.

Then, a valve 208 and a valve 211 were opened, and a valve 209 and a valve 210 were closed while operating a pump 206, thus circulating the pH-adjusted spent caustic soda between the second container 204 and the fourth container 207. Then, about 25 mL of hydrogen peroxide was injected into the second container 204 using a dropping pipette to cause an oxidation reaction. The oxidation reaction was performed at a temperature of about 57° C. and normal pressure for about 180 min. In this case, the ratio of oxidant:COD (based on weight) was about 2:1. After the oxidation reaction was finished, sodium hydroxide was injected thereto using a dropping pipette to adjust the pH of the spent caustic soda to about 7.

The test results thereof are given in Table 13 below.

TABLE 13

| Number of times | 1 | 2 | 3 | 4 | 5 | 6 | 7 | 8 | 9 | 10 |
|---|---|---|---|---|---|---|---|---|---|---|
| Phenol (mg/L) | 2339 | 2650 | 2890 | 3100 | 3150 | 3460 | 3640 | 3800 | 3850 | 4120 |

From the test results thereof, it was ascertained that red oil, which was no separated during Test, filled up the pores of a catalyst charged in a reactor to increase pressure difference, and thus fluid did not smoothly flow. Therefore, it was determined that the space velocity of fluid in the reactor was decreased, thus reducing the total reaction efficiency.

Comparative Example 3

In Comparative Example 3, ferrous sulfate powder (FeSO$_4$.7H$_2$O, Samchun Pure Chemical Co., Ltd., product name: Iron(II) Sulfate Heptahydrate, particle diameter: about 1 mm) was used instead of a trivalent iron-containing catalyst. The used amount of ferrous sulfate powder was about 10 g.

Figure 4:
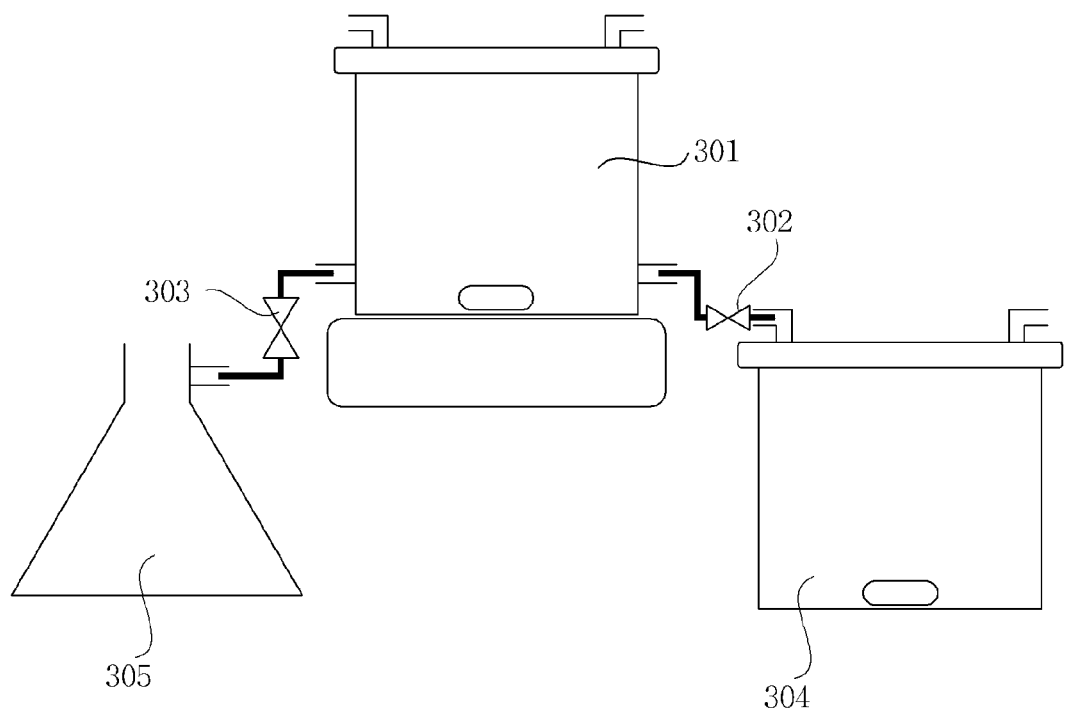
FIG. 4 is a schematic view showing a testing apparatus used in Comparative Example 3.

In Comparative Example 3, a testing apparatus shown in FIG. 4 was used. In FIG. 4, a first container 301, a second container 304 and a third container 305 were made of Pyrex, and their respective volumes were about 2.5 L, about 2.5 L and about 2 L.

2 L of spent caustic soda was introduced into a first container 301 and then stirred at a rotation speed of 150 rpm. The initial pH of spent caustic soda was measured using a pH meter, and the pH change thereof was observed while injecting sulfuric acid using a dropping pipette. Sulfuric acid was injected until the pH reaches about 2, and then the stirring was stopped, and the spent caustic soda was left for about 0.5 hr until it is separated into red oil (upper layer) and pH-adjusted spent caustic soda (lower layer). After the layer separation between the red oil and the pH-adjusted spent caustic soda was confirmed, a valve 302 was opened, and a valve 303 was closed to transfer the pH-adjusted spent caustic soda (lower layer) to a second container 304.

After the pH-adjusted spent caustic soda (lower layer) was completely transferred to the second container 304, the valve 302 was closed, and the valve 303 was opened to transfer the red oil (upper layer) to a third container 305. Then, the pH-adjusted spent caustic soda was stirred in the second container 304, and sodium hydroxide was injected thereto using a dropping pipette to adjust the pH of the spent caustic soda to about 3. Then, about 10 g of ferrous sulfate powder was injected into the second container 304, and then about 25 mL of hydrogen peroxide was injected into the second container 304 using a dropping pipette to cause an oxidation reaction. The oxidation reaction was performed at a temperature of about 57° C. and normal pressure for about 210 min. In this case, the ratio of oxidant:COD (based on weight) was about 2:1.

After the oxidation reaction was finished, sodium hydroxide was injected thereto using a dropping pipette to adjust the pH of the spent caustic soda to about 7, and then the pH-adjusted spent caustic soda was left for about 6 hours until floating materials were completely precipitated. After the precipitation of floating materials was confirmed, the height of the precipitated floating materials was measured, and was then converted into volume. The results thereof are given in Table 14.

TABLE 14

| Number of times | 1 | 2 | 3 | 4 | 5 | 6 | 7 | 8 | 9 | 10 |
|---|---|---|---|---|---|---|---|---|---|---|
| Volume (mL) | 115 | 121 | 120 | 119 | 119 | 120 | 123 | 122 | 121 | 120 |

In this test, the average volume of floating materials was about 120 mL.

As described above, it was ascertained in this Example that, when red oil is separated after pH adjustment, a subsequent oxidation treatment reaction using a trivalent iron-containing catalyst can be easily performed, and, particularly, the problem of forming sludge, occurring when a bivalent catalyst is used, can be basically prevented.

Example 4

Durability Test of Catalyst

Spent caustic soda was treated in the same manner as in Test 1 of Example 1, and the durability test of a catalyst was carried out by repeating a batch reaction for about 120 min while injecting new raw materials with respect to the same catalyst. The results thereof are given in Table 15 below.

TABLE 15

(unit: mg/L)

| Reaction time (hr) | number of times | | | |
| --- | --- | --- | --- | --- |
|  | 10 | 20 | 30 | 40 |
| 0 | 2000 | 2000 | 2000 | 2000 |
| 0.5 | 980 | 985 | 988 | 996 |
| 1 | 490 | 500 | 505 | 508 |
| 1.5 | 0 | 0 | 0 | 2 |
| 2 | 0 | 0 | 0 | 0 |

As given in Table 15 above, it was ascertained that the conversion rate of phenol was about 100% up to 40 times. Like this, it can be determined that a trivalent iron-containing catalyst exhibits excellent long-term durability during an oxidation treatment reaction.

Although the preferred embodiment of the present invention have been disclosed for illustrative purposes, those skilled in the art will appreciate that various modifications, additions and substitutions are possible, without departing from the scope and spirit of the invention as disclosed in the accompanying claims.

REFERENCE NUMERALS

1, 101: spent caustic soda supply unit
2: acid supply unit
3, 106: pH adjustment unit
4, 107: by-product recovery unit
5, 103: oxidant supply unit
6, 104: oxidation treatment unit
7, 108: subsequent treatment unit
102: first acid supply unit
105: second acid supply unit
201, 301: first container
202, 203, 208, 209, 210, 211, 302, 303: valve
204, 304: second container
205, 305: third container
206: pump
207: fourth container

The invention claimed is:

1. A method of treating spent caustic soda, comprising the steps of:
   a) providing spent caustic soda generated from at least one of an oil refining process and a petrochemical process;
   b) adding an acid to the spent caustic soda to neutralize the spent caustic soda to a pH of 1 to 9 to separate the spent caustic soda into an upper-layer fraction and a lower-layer fraction by layer separation and then recovering the upper-layer fraction as a by-product; and
   c) oxidation-treating the lower-layer fraction in the presence of a trivalent iron-containing catalyst by the addition of an oxidant.

2. A method of treating spent caustic soda, comprising the steps of:
   a) providing spent caustic soda containing mercaptan in an amount less than the amount selected from 150 to 200 mg/L, the mercaptan being introduced during a procedure of treating a product obtained from at least one of an oil refining process and a petrochemical process with caustic soda;
   b) adding an acid to the spent caustic soda to neutralize the spent caustic soda to a pH of 1 to 5 to separate the spent caustic soda into an upper-layer fraction and a lower-layer fraction by layer separation and then recovering the upper-layer fraction as a by-product; and
   c) oxidation-treating the lower-layer fraction in the presence of a trivalent iron-containing catalyst by the addition of an oxidant.

3. A method of treating spent caustic soda, comprising the steps of:
   a) providing spent caustic soda containing mercaptan in an amount more than the amount selected from 150 to 200 mg/L, the mercaptan being introduced during a procedure of treating a product obtained from at least one of an oil refining process and a petrochemical process with caustic soda;
   b) adding an acid to the spent caustic soda to neutralize the spent caustic soda to a pH of 5 to 9 to separate the spent caustic soda into an upper-layer fraction and a lower-layer fraction by layer separation and then recovering the upper-layer fraction as a by-product; and
   c) oxidation-treating the lower-layer fraction in the presence of a trivalent iron-containing catalyst by the addition of an oxidant.

4. The method of claim 3, further comprising the steps of: d) adding an acid to the oxidation-treated spent caustic soda to adjust the pH thereof to 2 or less; and e) separating the pH-adjusted spent caustic soda of step d) into an upper-layer fraction and a lower-layer fraction by layer separation and then recovering the upper-layer fraction as a by-product.

5. The method of claim 4, wherein the concentration of phenol in the lower-layer fraction separated in step b) is 5,000 mg/L or more.

6. The method of claim 1, wherein the trivalent iron-containing catalyst includes iron oxide ($Fe_2O_3$).

7. The method of claim 6, wherein the trivalent iron-containing catalyst further includes at least one co-catalyst selected from the group consisting of alkali metals, lanthanides and metals having photocatalytic activity in an amount of 1 to 60 wt % based on a total amount of the trivalent iron component.

8. The method of claim 7, wherein the trivalent iron-containing catalyst further includes a support, and the support is selected from the group consisting of silica, silica-alumina, zirconia, magnesia and a combination thereof.

9. The method of claim 6, wherein the content of iron oxide ($Fe_2O_3$) in the trivalent iron-containing catalyst is 20 to 90 wt %.

10. The method of claim 6, wherein the trivalent iron-containing catalyst is present in the form of a fixed bed during the oxidation treatment.

11. The method of claim 1, wherein the acid used in the neutralization reaction is sulfuric acid.

12. The method of claim 1, wherein the oxidant used in the oxidation treatment is hydrogen peroxide.

13. The method of claim 1, further comprising the step of additionally treating the treated spent caustic soda using dissolved air flotation.

14. The method of claim 1, wherein the oxidation treatment is performed at a temperature of 30 to 90° C. and a pressure of 1 to 10 atm.

15. The method of claim 2, wherein the oxidation treatment is performed for 60 to 240 min.

16. The method of claim 3, wherein the oxidation treatment is performed for 60 to 420 min.

17. The method of claim 1, wherein the amount of the upper-layer fraction recovered in step b) is 0.02 to 5 parts by volume, based on 100 parts by volume of the spent caustic soda provided in step a).

18. The method of claim 2, wherein the amount of the upper-layer fraction recovered in step b) is 1 to 5 parts by volume, based on 100 parts by volume of the spent caustic soda provided in step a).

19. The method of claim 3, wherein the amount of the upper-layer fraction recovered in step b) is 0.02 to 0.05 parts by volume, based on 100 parts by volume of the spent caustic soda provided in step a).

20. The method of claim 1, wherein the ratio of $Fe^{3+}$/oxidant in the catalyst is 0.4 to 10 based on equivalence in the oxidation treatment.

21. The method of claim 1, wherein the ratio of oxidant/COD is 1.5 to 2.5 based on weight in the oxidation treatment.

22. The method of claim 13, further comprising the step of coagulation treatment before the step of dissolved air floatation.

23. The method of claim 1, wherein the upper-layer fraction includes 20 to 30 wt % of a light component having a boiling point of 230° C. or lower and 70 to 80 wt % of a heavy component having a boiling point of higher than 230° C.

24. The method of claim 2, wherein the lower fraction of step b) has a COD of 10,000 to 16,000 mg/L and a phenol concentration of 1,000 to 4,000 mg/L.

25. The method of claim 2, wherein the pH of the pH of the step b) is adjusted to 1 to 3.

26. The method of claim 3, wherein the pH of the in the step b) is adjusted to 6 to 9.

* * * * *